US012597360B2

(12) United States Patent
Luscombe

(10) Patent No.: US 12,597,360 B2
(45) Date of Patent: Apr. 7, 2026

(54) STORY RIBBONS

(71) Applicant: Robyn Luscombe, Anna, TX (US)

(72) Inventor: Robyn Luscombe, Anna, TX (US)

( * ) Notice: Subject to any disclaimer, the term of this patent is extended or adjusted under 35 U.S.C. 154(b) by 0 days.

(21) Appl. No.: 19/242,449

(22) Filed: Jun. 18, 2025

(65) Prior Publication Data

US 2026/0045170 A1 Feb. 12, 2026

Related U.S. Application Data

(60) Provisional application No. 63/680,728, filed on Aug. 8, 2024.

(51) Int. Cl.
| | |
|---|---|
| *A63H 33/00* | (2006.01) |
| *A63H 33/22* | (2006.01) |
| *A63H 33/38* | (2006.01) |
| *G09B 1/28* | (2006.01) |
| *G09B 1/32* | (2006.01) |

(52) U.S. Cl.
CPC .............. *G09B 1/32* (2013.01); *A63H 33/22* (2013.01); *A63H 33/38* (2013.01); *G09B 1/28* (2013.01)

(58) Field of Classification Search
CPC ........ A63F 3/04; A63F 3/0402; A63F 3/0098; A63F 9/0803; A63F 9/0861; A63H 33/00; A63H 33/22; A63H 33/38; G09B 1/28
See application file for complete search history.

(56) References Cited

U.S. PATENT DOCUMENTS

| | | | | |
|---|---|---|---|---|
| 2,439,583 A | * | 4/1948 | Shamah | A63F 9/10 |
| | | | | D19/5 |
| 3,106,029 A | | 10/1963 | Desmond | |

| | | | | |
|---|---|---|---|---|
| 3,199,238 A | | 8/1965 | Brown | |
| 3,969,832 A | * | 7/1976 | Garruto | G09B 1/28 |
| | | | | 434/405 |
| 4,241,522 A | * | 12/1980 | Jablonski | G09B 1/28 |
| | | | | 434/405 |
| 5,794,980 A | | 8/1998 | Bigler | |
| 5,951,298 A | | 9/1999 | Werzberger | |
| 7,552,553 B2 | * | 6/2009 | Kelly | B42D 15/045 |
| | | | | 446/151 |
| 8,272,154 B2 | * | 9/2012 | Sapp | G09F 1/04 |
| | | | | 446/151 |
| 9,483,958 B1 | | 11/2016 | Feisthemel | |

(Continued)

OTHER PUBLICATIONS

"Jollybaby Soft Cloth Baby Books _Amazon.sg_ Toys_NPL" webpages https://www.amazon.sg/Jollybaby-Development-Interactive-Stroller-Goodnight/dp/B093GYJ5JM 4 pages printed from the internet on May 22, 2025.

*Primary Examiner* — John A Ricci

(74) *Attorney, Agent, or Firm* — Examiners Edge; Gary ONeill

(57) ABSTRACT

A communicable information apparatus and method for at least one user including a three-dimensional multilayer flexile stack having a first base layer set, a second intermediate layer set arranged in a stacked relation; and a third slidable layer set moveably embedded within the second intermediate layer set such that the third slidable layer set is reversibly extensible along a first dimension, wherein the third slidable layer set contains communicable information upon at least one face of at least one layer within the third slidable layer set, and wherein the communicable information is substantially one or more indicia for communicating with the at least one user.

20 Claims, 6 Drawing Sheets

(56)        References Cited

U.S. PATENT DOCUMENTS

| 10,449,467 | B1* | 10/2019 | Vaca ...................... A63H 37/00 |
| 10,625,531 | B1 | 4/2020 | Peterson |
| 10,888,798 | B1 | 1/2021 | Vaca |
| 2004/0082259 | A1* | 4/2004 | Yum ................... B42D 15/042 |
| | | | 446/151 |
| 2007/0028494 | A1* | 2/2007 | Crowell ................ G09F 11/00 |
| | | | 40/610 |
| 2009/0191518 | A1 | 7/2009 | Rappa |
| 2013/0305574 | A1 | 11/2013 | Nelson et al. |
| 2021/0104166 | A1 | 4/2021 | Linton |

* cited by examiner

A

B

C

STORY RIBBONS

CROSS-REFERENCE TO RELATED APPLICATIONS

This application claims priority to U.S. Application No. 63/680,728, filed Aug. 8, 2024 the contents of which are herein incorporated by reference in its entirety.

FEDERALLY SPONSORED RESEARCH AND DEVELOPMENT

N/A

JOINT RESEARCH AGREEMENT

N/A

BACKGROUND OF THE INVENTION

This application relates to an apparatus, method, and system for communication of information between people. From ancient times, indeed from the earliest inception of humanity, people have sought methods of communication of information. For example, the writings contained in Biblical records as inscribed throughout Genesis, Exodus, Leviticus, Numbers, and Deuteronomy as preserved in the alphanumeric apparatus, methods, and systems of the ancient Hebrew language of the Torah, provide a stunning catalogue of the oldest known forms of information communication. Within it pages can be found impressive arrays of teaching systems, learning systems, therapy systems, disciplinary systems, and moreover the elemental boundaries for systems of amusement, a play system, and perhaps even entertainment.

In more modern times advancements in information communication technologies are known and have exponentially expanded. Nonetheless, the need for communication of all manner of information as well as the underlying apparatus, methods, and systems needed to achieve it are not diminished.

Disclosed herein are modern apparatus, methods, and systems of communicable information including a teaching system, a learning system, a therapy system, a disciplinary system, an amusement system, a gaming system, a play system, or an entertainment system.

The communicable information apparatus, methods, and systems disclosed include communicable information such as at least one sequence of indicia which is alphabetic, numeric, alphanumeric, pictographic, a sacred book chapter and verse reference, a color sequence, a geometric shape, a fictional or non-fictional character representation, a non-English language alphabet, an American sign language, an international sign language, or a musical scale.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described apparatus, methods, or systems. Rather the use of "a" or "an" should be interpreted to mean "at least one" or "one or more".

In accordance with one general aspect of the present invention, a communicable information apparatus is provided. The communicable information apparatus for at least one user includes a three-dimensional multilayer flexile stack including, a first base layer set elongated along a first dimension, said first base layer set having a plurality of opposing lobes of arcuate contours; and a second intermediate layer set elongated along said first dimension, said second intermediate layer set arranged in a stacked relation with respect to said first base layer set, said stacked relation is along a second dimension orthogonal to said first dimension, said second intermediate layer set securely affixed to said first base layer set at least along a distal terminus of said second intermediate layer set such that said first base layer set along with said second intermediate layer set are cooperatively displaceable, at least in part; and a third slidable layer set including a plurality of faces and moveably embedded within said second intermediate layer set, said third slidable layer set securely affixed to said second intermediate layer set only along a distal terminus of said second intermediate layer set, said third slidable layer set further including a manipulable handle along a proximal terminus, said third slidable layer set reversibly extensible along said first dimension between a third slidable layer set maximally extended position and a third slidable layer set maximally reverse extended position; and said third slidable layer set containing communicable information upon at least one face of at least one layer within said third slidable layer set, such that information contained on said at least one face of said at least one layer within said third slidable layer set is revealed for communication with at least one user by extending said manipulable handle along said first dimension; and information contained on at least one face of at least one layer within said third slidable layer set is concealed from communication with at least one user by reversibly extending said manipulable handle along said first dimension; and a three-dimensional net displacement vector of at least one lobe of said first base layer set within the three-dimensional multilayer flexile stack is $\overline{U}_{xyz}$, wherein as the manipulable handle of the third slidable layer set extends, the variation in the value of $\overline{U}_{xyz}$ is proportionate.

In accordance with a second aspect of the present invention, the communicable information apparatus includes wherein the three-dimensional multilayer flexile stack has at least three degrees of translational and rotational freedom during flexure, and a rotational displacement matrix $R(\phi, \theta, \psi)$ is defined for at least one lobe of said first base layer set within the three-dimensional multilayer flexile stack, wherein as the manipulable handle of the third slidable layer set extends, the respective values of $\overline{U}xyz$ and $R(\phi, \theta, \psi)$ each vary.

In accordance with a third aspect of the present invention, the communicable information apparatus includes wherein the first base layer set comprises indicia on one or more faces of opposing lobes of arcuate contours.

In accordance with a fourth aspect of the present invention, the communicable information apparatus includes wherein the three-dimensional multilayer flexile stack comprises at least one textile layer.

In accordance with a fifth aspect of the present invention, the communicable information apparatus includes wherein the communicable information comprises at least one sequence of alphabetic, numeric, or alphanumeric indicia.

In accordance with a sixth aspect of the present invention, the communicable information apparatus includes wherein the communicable information comprises at least one sequence of pictographic indicia.

In accordance with a seventh aspect of the present invention, the communicable information apparatus includes wherein the communicable information comprises at least one sequence of a sacred book chapter and verse reference indicia.

In accordance with an eighth aspect of the present invention, the communicable information apparatus includes wherein the communicable information comprises at least one color sequence indicia within the visible light spectrum.

In accordance with a nineth aspect of the present invention, the communicable information apparatus includes wherein the communicable information comprises at least one sequence of geometric shape indicia.

In accordance with a tenth aspect of the present invention, the communicable information apparatus includes wherein the communicable information comprises at least one sequence of fictional or non-fictional character representations indicia.

In accordance with an eleventh aspect of the present invention, the communicable information apparatus includes wherein the communicable information comprises at least one sequence of non-English language alphabetic indicia.

In accordance with a twelfth aspect of the present invention, the communicable information apparatus includes wherein the communicable information comprises at least one sequence of American sign language or an international sign language indicia.

In accordance with a thirteenth aspect of the present invention, the communicable information apparatus includes wherein the communicable information comprises at least one sequence of a musical scale indicia.

In accordance with a fourteenth aspect of the present invention, the communicable information apparatus includes wherein the third slidable layer set contains communicable information upon at least two faces of at least one layer within said third slidable layer set.

In accordance with a fifteenth aspect of the present invention, the communicable information apparatus includes wherein the third slidable layer set contains communicable information upon at least two obverse faces of at least one layer within said third slidable layer set, wherein upon extending said manipulable handle along said first dimension, a first face of at least one layer within said third slidable layer set is revealed for communication with a first user and a second face of said at least one layer within said third slidable layer set is simultaneously revealed for communication with a second user.

In accordance with a sixteenth aspect of the present invention, the communicable information apparatus includes wherein the third slidable layer set securely affixed to said second intermediate layer set only along a distal terminus is further removably secured via a fastener, wherein said third slidable layer set is removably attached for replacement of said third slidable layer set.

In accordance with a seventeenth aspect of the present invention, the communicable information apparatus includes wherein a communicable information apparatus for at least one user includes a three-dimensional multilayer flexile stack including, a first base layer set elongated along a first dimension, said first base layer set having a plurality of opposing lobes of arcuate contours; and a second intermediate layer set elongated along said first dimension, said second intermediate layer set arranged in a stacked relation with respect to said first base layer set, said stacked relation is along a second dimension orthogonal to said first dimension, said second intermediate layer set securely affixed to said first base layer set at least along a distal terminus of said second intermediate layer set such that said first base layer set along with said second intermediate layer set are cooperatively displaceable, at least in part; and a third slidable layer set including a plurality of faces and moveably embedded within said second intermediate layer set, said third slidable layer set securely affixed to said second intermediate layer set only along a distal terminus of said second intermediate layer set, said third slidable layer set further including a manipulable handle along a proximal terminus, said third slidable layer set reversibly extensible along said first dimension between a third slidable layer set maximally extended position and a third slidable layer set maximally reverse extended position; and said third slidable layer set containing communicable information upon at least one face of at least one layer within said third slidable layer set, such that information contained on said at least one face of said at least one layer within said third slidable layer set is revealed for communication with at least one user by extending said manipulable handle along said first dimension; and information contained on at least one face of at least one layer within said third slidable layer set is concealed from communication with at least one user by reversibly extending said manipulable handle along said first dimension; and a three-dimensional net displacement vector of at least one lobe of said first base layer set within the three-dimensional multilayer flexile stack is $\overline{U}xyz$, wherein as the manipulable handle of the third slidable layer set extends, the variation in the value of $\overline{U}xyz$ is proportionate; and wherein said communicable information comprises at least one sequence of indicia which is alphabetic, numeric, alphanumeric, pictographic, a sacred book chapter and verse reference, a color sequence, a geometric shape, a fictional or non-fictional character representation, a non-English language alphabet, an American sign language, an international sign language, or a musical scale.

In accordance with an eighteenth aspect of the present invention, a communicable information method for at least one user includes forming a three-dimensional multilayer flexile stack including, a step of adding a first base layer set elongated along a first dimension, said first base layer set having a plurality of opposing lobes of arcuate contours; and a step of adding a second intermediate layer set elongated along said first dimension, said second intermediate layer set arranged in a stacked relation with respect to said first base layer set, said stacked relation is along a second dimension orthogonal to said first dimension, said second intermediate layer set securely affixed to said first base layer set at least along a distal terminus of said second intermediate layer set such that said first base layer set along with said second intermediate layer set are cooperatively displaceable, at least in part; and a step of adding a third slidable layer set including a plurality of faces and moveably embedded within said second intermediate layer set, said third slidable layer set securely affixed to said second intermediate layer set only along a distal terminus of said second intermediate layer set, said third slidable layer set further including a manipulable handle along a proximal terminus, said third slidable layer set reversibly extensible along said first dimension between a third slidable layer set extended position and a third slidable layer set reverse extended position; and adding communicable information upon at least one face of at least one layer within said third slidable layer set, such that information contained on said at least one face of said at least one layer within said third slidable layer set is revealed for communication with at least one user by extending said manipulable handle along said first dimension; and said information contained on at least one face of at least one layer within said third slidable layer set is concealed from communication with at least one user by reversibly extending said manipulable handle along said first dimension; and a three-dimensional net displacement vector of at least one lobe of said first base layer set within the three-dimensional multilayer flexile stack is $\overline{U}xyz$, wherein the step of extending the manipulable handle of the third slidable layer set, varies the value of $\overline{U}xyz$ proportionately.

In accordance with a nineteenth aspect of the present invention, the communicable information method includes wherein the communicable information comprises at least one sequence of indicia which is alphabetic, numeric, alphanumeric, pictographic, a sacred book chapter and verse reference, a color sequence, a geometric shape, a fictional or non-fictional character representation, a non-English language alphabet, an American sign language, an international sign language, or a musical scale.

In accordance with a twentieth aspect of the present invention, the communicable information method includes wherein the communicable information method is a teaching method, a learning method, a therapy method, a disciplinary method, an amusement method, a gaming method, a play method, or an entertainment method.

Embodiments of the invention may include one or more of the following features. These features may be used singly, or in combination with each other.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
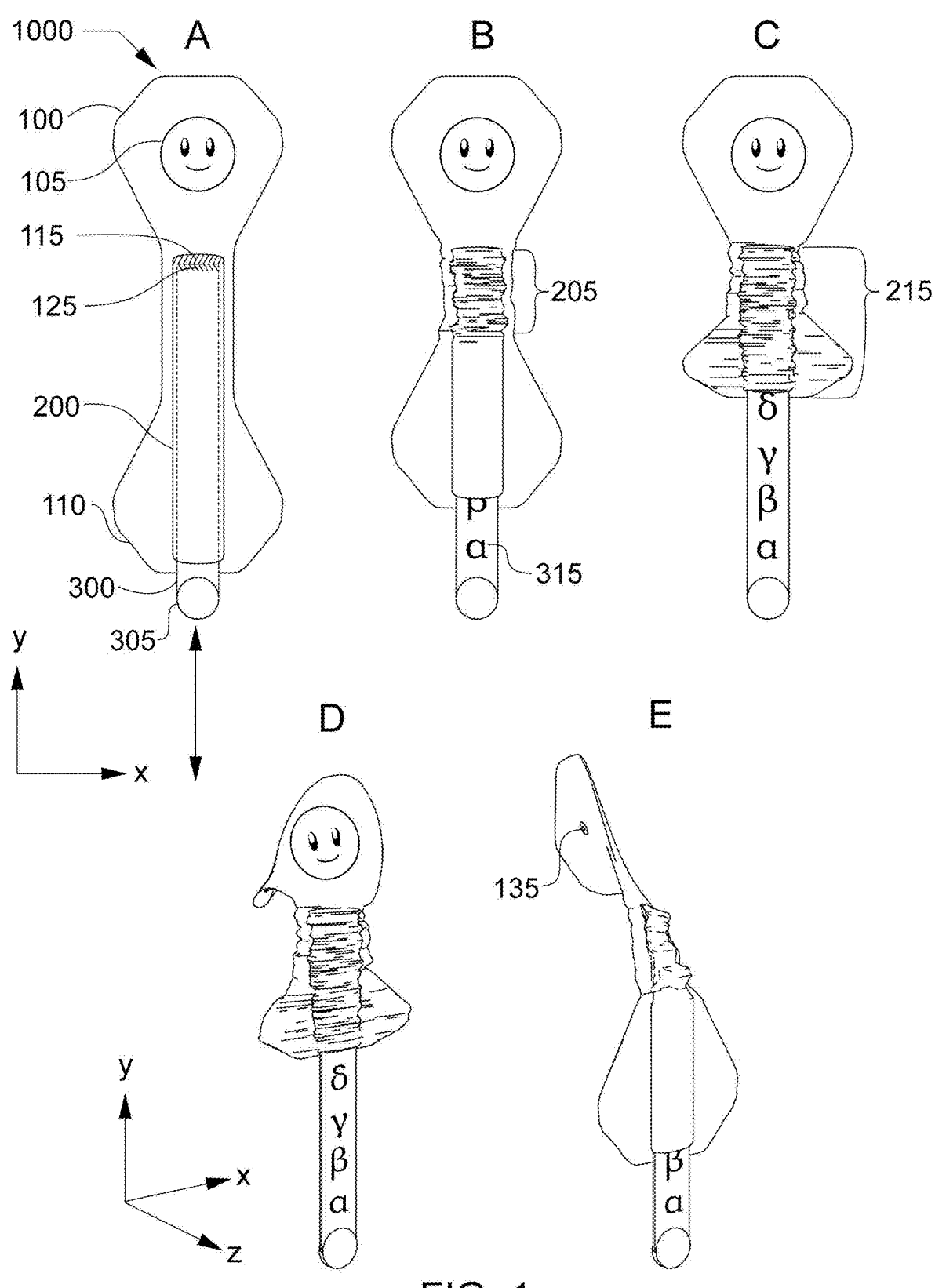
FIGS. 1A-1E show a top view of a communicable information three-dimensional multilayer flexile stack that is arranged into a plurality of positions in accordance with an exemplary embodiment.
Figure 2:
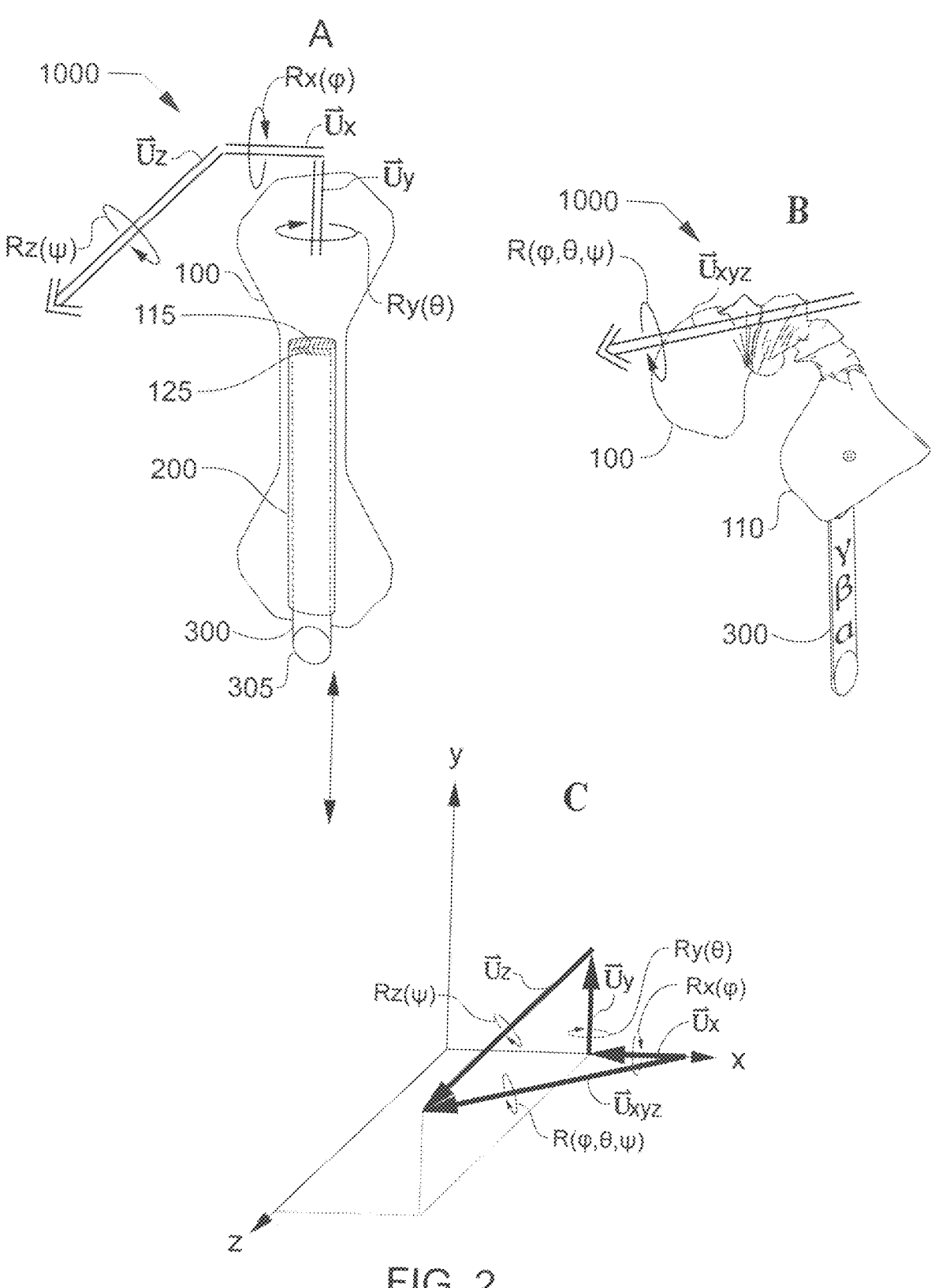
FIGS. 2A, 2B, 2C show a top view of a communicable information three-dimensional multilayer flexile stack flexure according to a three-dimensional net displacement vector in accordance with an exemplary embodiment.
Figure 3:
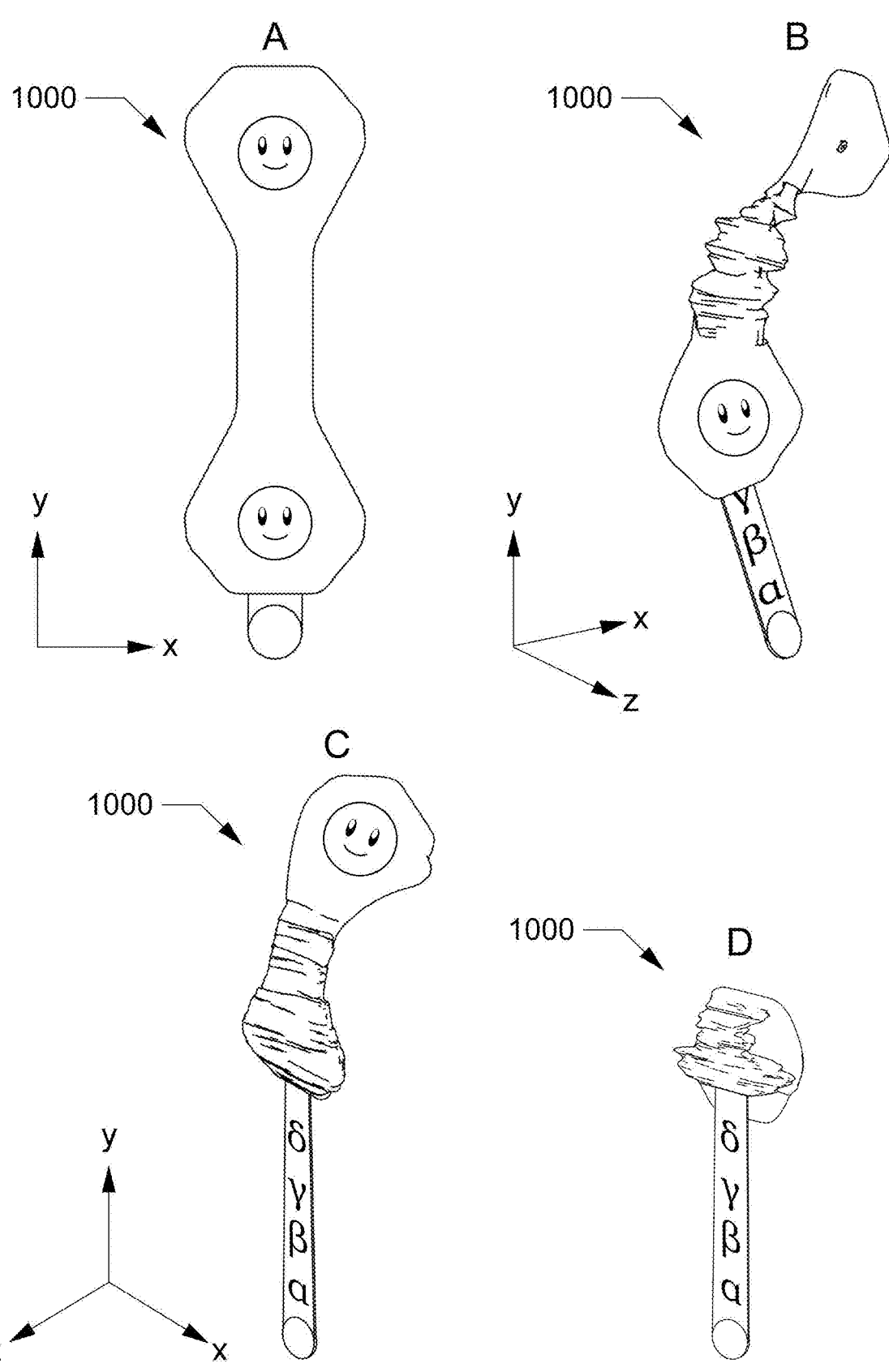
FIGS. 3A-3D show a bottom view of a communicable information three-dimensional multilayer flexile stack that is arranged into a plurality of positions in accordance with an exemplary embodiment.
Figure 4:
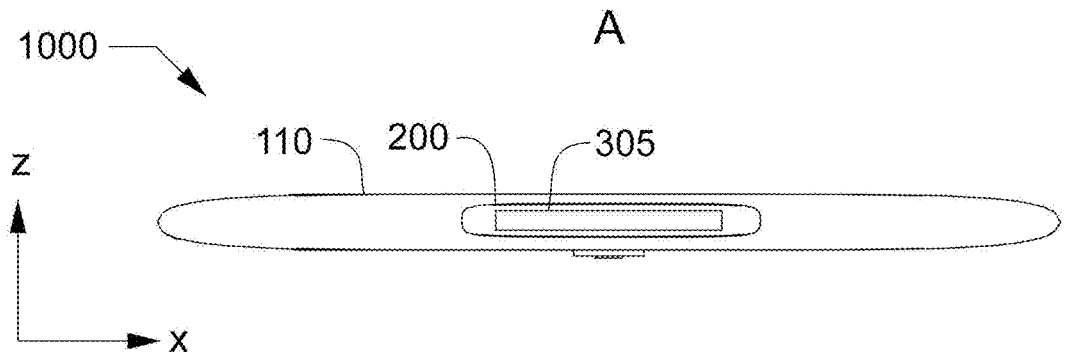
FIG. 4A shows a front view of a communicable information three-dimensional multilayer flexile stack in accordance with an exemplary embodiment.
FIG. 4B shows a side view of a communicable information three-dimensional multilayer flexile stack flexure in accordance with an exemplary embodiment.
FIG. 4C shows another side view of a communicable information three-dimensional multilayer flexile stack flexure in accordance with an exemplary embodiment.
Figure 4:
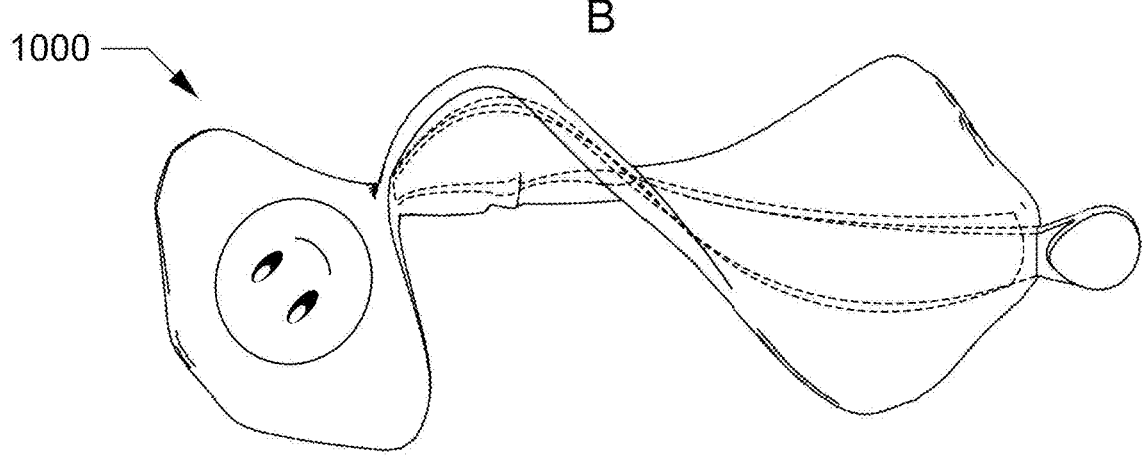
Figure 4:
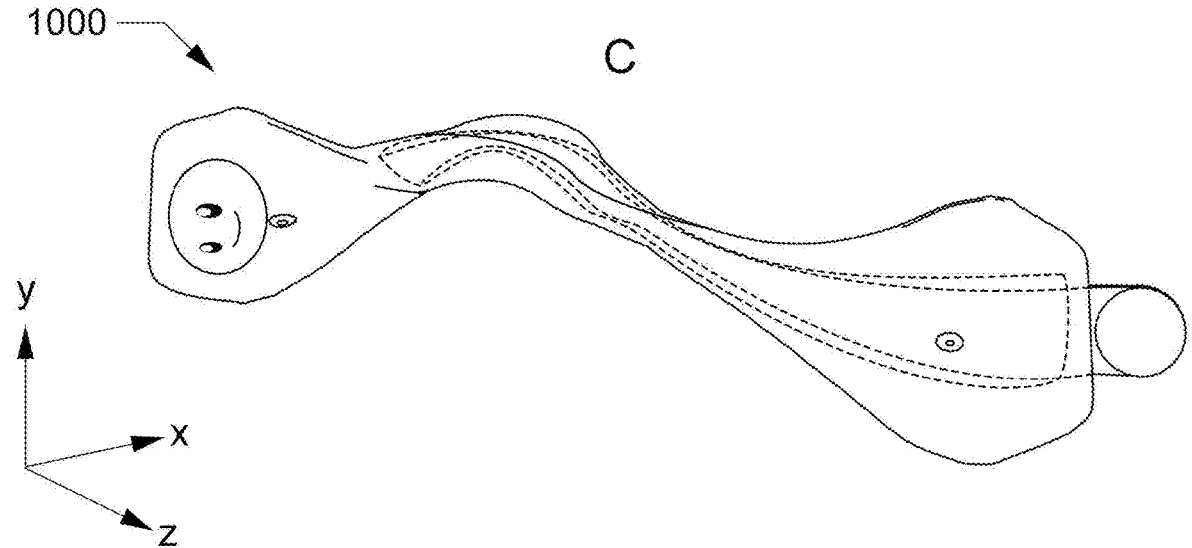
Figure 5:
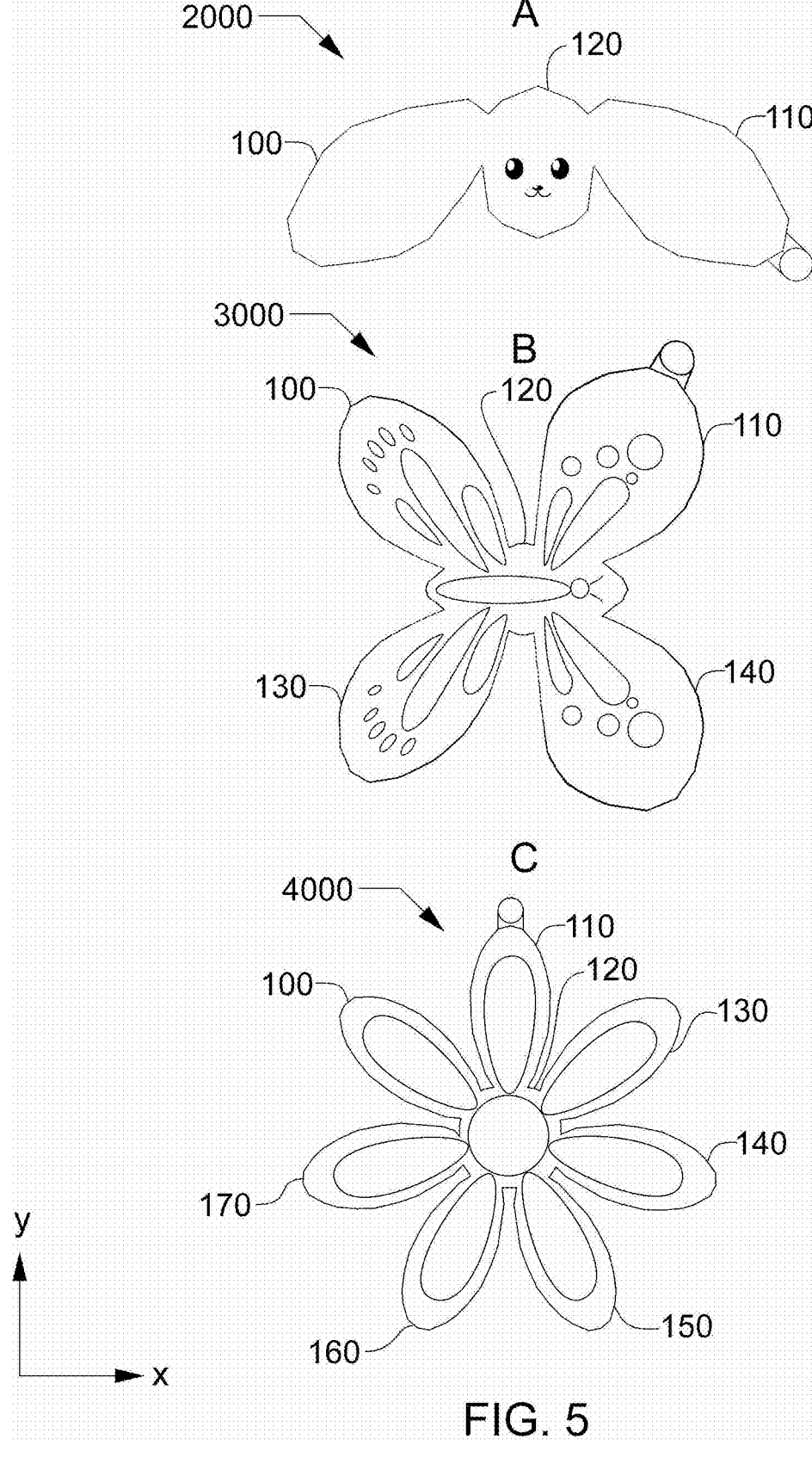
FIG. 5A shows a bottom view of a communicable information three-dimensional multilayer flexile stack having a plurality of opposing lobes in accordance with another exemplary embodiment.
FIG. 5B shows a bottom view of a communicable information three-dimensional multilayer flexile stack having a plurality of opposing lobes in accordance with another exemplary embodiment.
FIG. 5C shows a bottom view of a communicable information three-dimensional multilayer flexile stack having a plurality of opposing lobes in accordance with another exemplary embodiment.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Referring to FIGS. 1A-5C, 6 various views of a communicable information three-dimensional multilayer flexile stacks 1000, 2000, 3000, 4,000 and 5000 are shown.

Referring to FIGS. 1A-IE, a top view of a communicable information three-dimensional multilayer flexile stack 1000 that is arranged into a plurality of positions in accordance with an exemplary embodiment is shown.

As shown in FIG. 1A the communicable information apparatus for at least one user includes a three-dimensional multilayer flexile stack 1000. The three-dimensional multilayer flexile stack 1000 includes a first base layer set 100, 110. The first base layer set 100, 110 includes a set of one or more layers that are elongated along a first dimension, such as for example, a Y axis dimension. Each layer of the first base layer set 100, 110 is formed as a plurality of opposing lobes. Each lobe of each layer of the first base layer set 100, 110 has an arcuate contour.

One or more faces of the opposing lobes having arcuate contours of each layer of the first base layer set 100, 110 may further include iconic indicia 105 on the one or more faces. The iconic indicia 105 may include selected symbology or pictographic images that may correspond to any of the various methods of use of the three-dimensional multilayer flexile stacks 1000, 2000, 3000, 4000, 5000 as described below.

The three-dimensional multilayer flexile stack 1000 includes a second intermediate layer set 200. The second intermediate layer set 200 includes a set of one or more layers that are elongated along said first dimension, such as for example, a Y axis dimension. The second intermediate layer set 200 is arranged in a stacked relation with respect to the first base layer set 100, 110, the stacked relation is along a second dimension that is orthogonal to the first dimension. In one example, the first dimension is a Y axis dimension and the second dimension is a Z axis dimension.

The second intermediate layer set 200 is securely affixed to the first base layer set 100, 110 at least along a distal terminus of said second intermediate layer set 200. The second intermediate layer set 200 is securely affixed to the first base layer set 100, 110 via a first securing element 115. The first securing element 115 may be a sewn thread, a hook and loop element, a snap, a retainer, a latch, a zipper, an adhesive sealer, a staple, a clip, a hook and eye element, a bolt, a buckle, a clamp, a clasp, a hasp, a bracket, a catch, a grip, a lock, or equivalent fasteners as are known in the art. The first securing element 115 may be permanently or removably attached to the first base layer set 100, 110 and the second intermediate layer set 200 such that said first base layer set 100, 110 along with the second intermediate layer set 200 are cooperatively displaceable, at least in part. For example, as best shown in FIG. 1B at 205 and in FIG. 1C at 215, the first base layer set 110 along with the second intermediate layer set 200 are cooperatively and partially displaced during movements of the three-dimensional multilayer flexile stack 1000 as further described below.

The three-dimensional multilayer flexile stack 1000 includes a third slidable layer set 300. The third slidable layer set 300 includes a set of one or more layers that have a plurality of faces. The third slidable layer set 300 is moveably embedded within the second intermediate layer set 200. The third slidable layer set 300 is further securely affixed to the second intermediate layer set 200 only along a distal terminus of the second intermediate layer set 200. The third slidable layer set 300 is securely affixed to the second intermediate layer set 200 via a second securing element 125. The second securing element 125 may include one or more of the securing elements disclosed above with respect to the first securing element 115. The second securing element 125 includes removable attachment securing elements. By removable attachment of the second securing element 125, the third slidable layer set 300 may be replaced by a user with another third slidable layer set 300, such that the another third slidable layer set 300 has different communicable information 315 upon at least one face, as further described below. In this way, a user may change from one activity to another as explained in the various methods of use below.

A third securing elements 135 are depicted in FIG. 1E. The third securing elements 135 may be attachment mechanisms such as fastening elements. Fastening elements may include snap buttons, press buttons, press studs, press fasteners, dome fasteners, poppers, and similar mechanical attachment mechanisms. In operation the third securing elements 135 may be mated to removably connect pairs of opposing lobes of each layer of the first base layer set 100, 110 having arcuate contours. Therefore when opposing lobes of each layer of the first base layer set 100, 110 having arcuate contours of the three-dimensional multilayer flexile stack 1000, 2000, 3000, 4000 and 5000 are extensively flexed, the third securing elements 135 may be mated such that the entire three-dimensional multilayer flexile stack 1000, 2000, 3000, 4000 and 5000 forms a looped configuration as best shown in FIG. 3D and partially shown in FIG. 1E. As such when the entire three-dimensional multilayer flexile stack 1000, 2000, 3000, 4000 and 5000 forms a looped configuration, the three-dimensional multilayer flexile stack 1000, 2000, 3000, 4000 and 5000 may be wrapped around a limb of a user, such as the arm of a teacher or the arm of a student. Likewise, the looped configuration may be used for attachment to a bag or luggage for case of transport. In this position, numerous methods of use of the three-dimensional multilayer flexile stacks 1000, 2000, 3000, 4000 and 5000 are also available as further described below.

Again as shown in FIGS. 1A-1E, a manipulable handle 305 is attached to a proximal terminus of the third slidable layer set 300. The manipulable handle 305 that is attached to the proximal terminus of the third slidable layer set 300 may be manipulated by a user to allow the user to slidably move the third slidable layer set 300. Specifically, the third slidable layer set 300 is reversibly extensible in two directions along the first dimension, for example up and down, forward and backward, or in and out. Manipulation of the manipulable handle 305 by a user in a first direction thus causes the third slidable layer set 300 to move in the first direction to a maximally extended position, for example from FIG. 1A to FIG. 1B to FIG. 1C to FIG. 1D. Manipulation of the manipulable handle 305 by a user in a second direction thus causes the third slidable layer set 300 to move in the second direction to a maximally reverse extended position, for example from FIG. 1D to FIG. 1C to FIG. 1B to FIG. 1A.

As shown for example in FIGS. 1B-1E, the third slidable layer set 300 further contains communicable information 315 upon at least one face of at least one layer within said third slidable layer set 300. In the figures, communicable information 315 is represented by letters of the Greek alphabet such as α, β, γ, δ, etc. The communicable information 315 that is represented by Greek alphabet letters comprises at least one sequence of indicia. This indicia may include alphabetic, numeric, alphanumeric, or pictographic indicia. Moreover, the indicia may also or alternatively include reference indications with respect to a sacred book chapter and verse markers, for example Biblical book demarcations. The indica may also or alternatively include various color spectrum sequences, geometric shape sequences, character representations of fictional or non-fictional characters. The indica may also or alternatively include various character or marker sequences from a non-English language alphabet, an American sign language sequence, an international sign language sequence, or a musical scale sequence.

The communicable information 315 thus contained within the communicable information three-dimensional multilayer flexile stack 1000, 2000, 3000, 4000 and 5000 may be used to facilitate various activities between one or more users of the three-dimensional multilayer flexile stack 1000, 2000, 3000, 4000 and 5000. These activities may include methods such as teaching methods and/or learning methods. For example, the three-dimensional multilayer flexile stack 1000, 2000, 3000, 4000 and 5000 may be used to teach the English alphabet to children or to adults for whom English is a second or third language. Similarly, the three-dimensional multilayer flexile stack 1000, 2000, 3000, 4000 and 5000 may be used in support of a study method for those learning the English alphabet. As will be apparent to those of ordinary skill in the art, the three-dimensional multilayer flexile stack 1000, 2000, 3000, 4000 and 5000 may also be used to facilitate teaching methods and/or learning methods where the subject matter or topics include numeration, pictographic sequences such as in stories, memorization or study of sacred book chapter and/or verse sequences, primary or secondary color spectrum sequences, geometric shape types and sequences, and/or character representations of fictional or non-fictional characters, such as lists of presidents, inventors, or fairy tale actors.

Moreover, the three-dimensional multilayer flexile stack 1000, 2000, 3000, 4000 and 5000 may further be used to facilitate teaching methods and/or learning methods where the subject matter includes teaching or learning of various character or marker sequences from any non-English language alphabet, for example a Chinese or a Hebrew alphabet character sequence, and/or an American sign language character sequence, and/or an international sign language character sequence, or for teaching or learning of musical scale sequences. As will be readily understood by those of ordinary skill in the pedagogical and andragogical arts, many other applications and objectives many be attained using the three-dimensional multilayer flexile stacks 1000, 2000, 3000, 4000 and 5000 for assessments, for brainstorming activities, or for use in remote locations without the need for electricity or access to the varieties of electromagnetic wave connectivity, to name a few.

Yet, the three-dimensional multilayer flexile stacks 1000, 2000, 3000, 4000 and 5000 is by no means limited to the arenas of pedagogy or andragogy. Exemplary methods of applying the three-dimensional multilayer flexile stacks 1000, 2000, 3000, 4000 and 5000 include varieties of therapies or therapeutic methods, whether for counseling, within the healing arts, or for motivational activities. Limited only by the imagination of the users, educators and/or parents may further employ the present three-dimensional multilayer flexile stacks 1000, 2000, 3000, 4000 and 5000 in disciplinary methods, amusement methods, gaming methods, play methods or therapies, entertainment methods or similar activities. Therefore, it will be apparent that the three-dimensional multilayer flexile stacks 1000, 2000, 3000, 4000 and 5000 have broad and diverse applications and adaptability.

Returning now to FIGS. 1A-IE, manipulation of the manipulable handle 305 by a user in a first direction causes the communicable information 315 contained on at least one face of at least one layer within the third slidable layer set 300 to be revealed for communication with at least one user as the manipulable handle 305 is extended along a first dimension, as shown for example in FIG. 1C.

Similarly, manipulation of the manipulable handle 305 by a user in a second direction causes the communicable information 315 contained on at least one face of at least one layer within said third slidable layer set 300 to be concealed from communication with at least one user as the manipulable handle 305 is reversibly extended along the first dimension, as shown for example in FIG. 1B.

Therefore, in operation, manipulation of the manipulable handle 305 by a user to extend or reversibly extend the communicable information 315 contained on at least one face of at least one layer within the third slidable layer set 300 along respective first and second directions further enables the three-dimensional multilayer flexile stacks 1000, 2000, 3000, 4000 and 5000 to facilitate teaching methods and/or learning methods, memorization, therapies, disciplinary methods, amusement, gaming, singular or multi-user play, or imaginative entertainments.

Moreover, the third slidable layer set 300 may be constructed to contain communicable information 315 upon at least two obverse faces of at least one layer within said third slidable layer set 300. In this embodiment, upon extending the manipulable handle 305 along the first dimension, a first face of at least one layer within the third slidable layer set 300 is revealed for communication with a first user and a second face of the at least one layer within the third slidable layer set 300 is simultaneously revealed for communication with a second user. The structure of this embodiment is particularly useful for multi-user play, therapist/client interactions, multi-user gaming, or any other method of use involving more than one user. Additionally, this structure is also advantageous for use cases in which a single user may switch between two roles. As one example during a self-testing session, a single user may begin by acting as an instructor by revealing the communicable information to be memorized but later conceal the communicable information to act as a student during recitation of the memorized communicable information.

Turning now to the FIGS. 2A and 2B, depicted therein are three-dimensional multilayer flexile stacks 1000 in motion. As explained above for FIGS. 1A-1E, a manipulable handle 305 is attached to the third slidable layer set 300 for reversibly extensible manipulation by users to thus allow users to slidably move the third slidable layer set 300.

Beginning then in FIG. 2A, a user manipulates the manipulable handle 305 and thus extends the third slidable layer set 300 along at least a first dimension, for example a Y axis dimension. Since, as described above, the first securing element 115 is attached such that the first base layer set 100, 110 along with the second intermediate layer set 200 are cooperatively displaceable, at least in part, and as was further described the third slidable layer set 300 is also securely affixed to the second intermediate layer set 200 via a second securing element 125, therefore extending of the third slidable layer set 300 causes cooperative flexion of the first base layer set 100, 110 along with the second intermediate layer set 200 as depicted in FIG. 1B at 205 and in FIG. 1C at 215.

Specifically, depicted in FIG. 2A and FIG. 2B are exemplary motion vectors of the three-dimensional multilayer flexile stacks 1000, including representative cooperative flexions. As defined and shown therein, $\overline{U}_y$ represents a translational displacement vector along a Y axis direction, and $\overline{U}_x$ represents a translational displacement vector along an X axis direction, and $\overline{U}_z$ represents a translational displacement vector along a Z axis direction. Therefore, a three-dimensional net translational displacement vector $\overline{U}_{xyz}$ may be defined as the vector summation of each of the three dimensions of translational vector displacements. Thus, $\overline{U}_{xyz}=\overline{U}_x+\overline{U}_y+\overline{U}_z$=the three-dimensional net displacement vector.

Moreover, in addition to translational displacement, a flexural motion may further include rotational displacement components about each axis. Accordingly, a rotational displacement matrix R($\phi$, $\theta$, $\psi$) may be defined, wherein Rx($\theta$) represents rotation matrix about the X axis, Ry($\theta$) represents rotation matrix about the Y axis, and Rz($\psi$) represents rotation matrix about the Z axis. The flexural motion of the three-dimensional multilayer flexile stacks 1000 thereby comprises both translational displacement $\overline{U}_{xyz}$ and rotational displacement matrix R($\phi$, $\theta$, $\psi$).

FIGS. 2A, 2F shows exemplary motions, flexions, and cooperative displacements of the first base layer sets 100, 110, the second intermediate layer sets 200, and the third slidable layer sets 300 of the three-dimensional multilayer flexile stacks 1000 at a partial extension in relation to the three-dimensional net translational displacement vector $\overline{U}_{xyz}$, and a rotational displacement matrix R($\phi$, $\theta$, $\psi$).

As will be readily understood by those of ordinary skill in the art, the three-dimensional multilayer flexile stacks 1000 have at least three degrees of translational freedom and three degrees of rotational freedom during flexure. The three-dimensional multilayer flexile stacks 1000 are thus constructed from materials that are durable while also allowing for a high degree of flexion. In embodiments, one or more layers may be formed from a high flexion textile.

As depicted in FIGS. 2A, 2B, the reversible extension of the manipulable handle 305 within the structure of the three-dimensional multilayer flexile stacks 1000 creates torsional forces within the three-dimensional multilayer flexile stacks 1000. These torsional forces cause various displacements of the three-dimensional multilayer flexile stacks 1000 including layers having a plurality of opposing lobes of arcuate contours. The three-dimensional net displacement vector $\overline{U}_{xyz}$ and rotational displacement matrix R($\phi$, $\theta$, $\psi$) represents the resultant twisting, flexure, lobe distortions, and cooperative layer set displacements to the various structures of the three-dimensional multilayer flexile stacks 1000 as the manipulable handle 305 of the third slidable layer set 300 reversibly extends. As will be understood by those of ordinary skill in the art, the variation in the value of the three-dimensional net displacement vector $\overline{U}_{xyz}$ is proportionate to the movement of the manipulable handle 305 and thus the reversible movement of the third slidable layer set 300. Moreover, the values of the rotational displacement matrix R($\phi$, $\theta$, $\psi$) also vary according to the movement of the manipulable handle 305 and thus the reversible movement of the third slidable layer set 300.

FIG. 2C shows a graphical representation of the variation in the value of the three-dimensional net displacement vector $\overline{U}_{xyz}$ which is the vector summation of each of the three dimensions of vector displacements, that is, $\overline{U}_{xyz}=\overline{U}_x+\overline{U}_y+\overline{U}_z$. Also depicted in FIG. 2C is a rotational displacement matrix R($\phi$, $\theta$, $\psi$) about the X, Y, and Z axes, respectively.

The FIGS. 3A-3D show a bottom view of the three-dimensional multilayer flexile stack 1000 including communicable information 315, as the three-dimensional multilayer flexile stack 1000 is arranged into a plurality of positions as depicted in FIGS. 3A, 3B, 3C and 3D. As will be readily understood by those of ordinary skill in the art, the exemplary motions, flexions, and cooperative displacements as were previously described in relation to the FIGS. 2A, 2B, 2C from another perspective view, including the three-dimensional net displacement vector $\overline{U}_{xyz}$, the rotational displacement matrix R($\phi$, $\theta$, $\psi$), and components thereof therefore correspond to the torsional forces and three-dimensional net displacement vectors in FIGS. 3A-3D and thus will not be further described.

The FIG. 4A shows a front view of the three-dimensional multilayer flexile stack 1000 as described above in an embodiment. FIG. 4A particularly shows the stacked relationships along two dimensions of the first base layer sets 100, 110, the second intermediate layer sets 200, and the manipulable handle 305 that is also attached to the third slidable layer sets 300 of the three-dimensional multilayer flexile stacks 1000.

The FIGS. 4B and 4C each show various side views of the three-dimensional multilayer flexile stack 1000 flexure in accordance with exemplary embodiments. As will be readily understood by those of ordinary skill in the art, the exemplary motions, flexions, and cooperative displacements as were previously described in relation to the FIGS. 2A, 2B, 2C from another perspective, including the three-dimensional net displacement vector $\overline{U}_{xyz}$, the rotational displacement matrix R($\phi$, $\theta$, $\psi$), and components thereof therefore correspond to the torsional forces and three-dimensional net displacement vectors in FIGS. 4B and 4C and thus will not be further repeated.

Turning now to FIG. 5A is shown a bottom view of a communicable information three-dimensional multilayer flexile stack 2000 having a plurality of opposing lobes in accordance with another exemplary embodiment. In this embodiment, the three-dimensional multilayer flexile stack 2000 shares and incorporates many of the features and characteristics of the three-dimensional multilayer flexile stack 1000 as described in the previous embodiments above. In this embodiment, the three-dimensional multilayer flexile stack 2000 also includes at least an additional layer set formed as lobes 120 that also have arcuate contours. The lobes 120 may be of smaller, larger, or essentially equivalent dimensions with respect to the other first base layer sets 100, 110 lobes. Moreover, the lobes 120 may also include representative iconic indicia on one or more faces, which iconic indicia may be similar to or distinct from the iconic indicia 105 as described previously with respect to other embodiments. Thus, the representative iconic indicia may include selected symbology or pictographic images that may correspond to any of the various methods of use of any of the three-dimensional multilayer flexile stacks 1000, 2000, 3000, 4000, 5000.

Turning now to the FIGS. 5B and 5C are shown a bottom view of communicable information three-dimensional multilayer flexile stacks 3000 and 4000 respectively having a plurality of opposing lobes in accordance with additional exemplary embodiments. In these embodiments, the three-dimensional multilayer flexile stacks 3000, 4000 share and incorporate many of the features and characteristics of the three-dimensional multilayer flexile stack 1000 as described in the previous embodiments above. In these embodiments, the three-dimensional multilayer flexile stacks 3000, 4000 also include additional layer sets formed as lobes 120, 130, 140, 150, 160 and 170 that also have arcuate contours. The additional layer sets formed as lobes 120, 130, 140, 150, 160 and 170 may be of varying sizes and thus be of smaller, larger, or essentially equivalent dimensions with respect to the other first base layer sets 100, 110 lobes. Moreover, the additional layer sets formed as lobes 120, 130, 140, 150, 160 and 170 may also include representative iconic indicia on one or more faces, which iconic indicia may be similar to or distinct from the iconic indicia 105 as described previously with respect to other embodiments. Thus, the representative iconic indicia may include selected symbology or pictographic images that may correspond to any of the various methods of use of any of the three-dimensional multilayer flexile stacks 1000, 2000, 3000, 4000, 5000.

Figure 6:
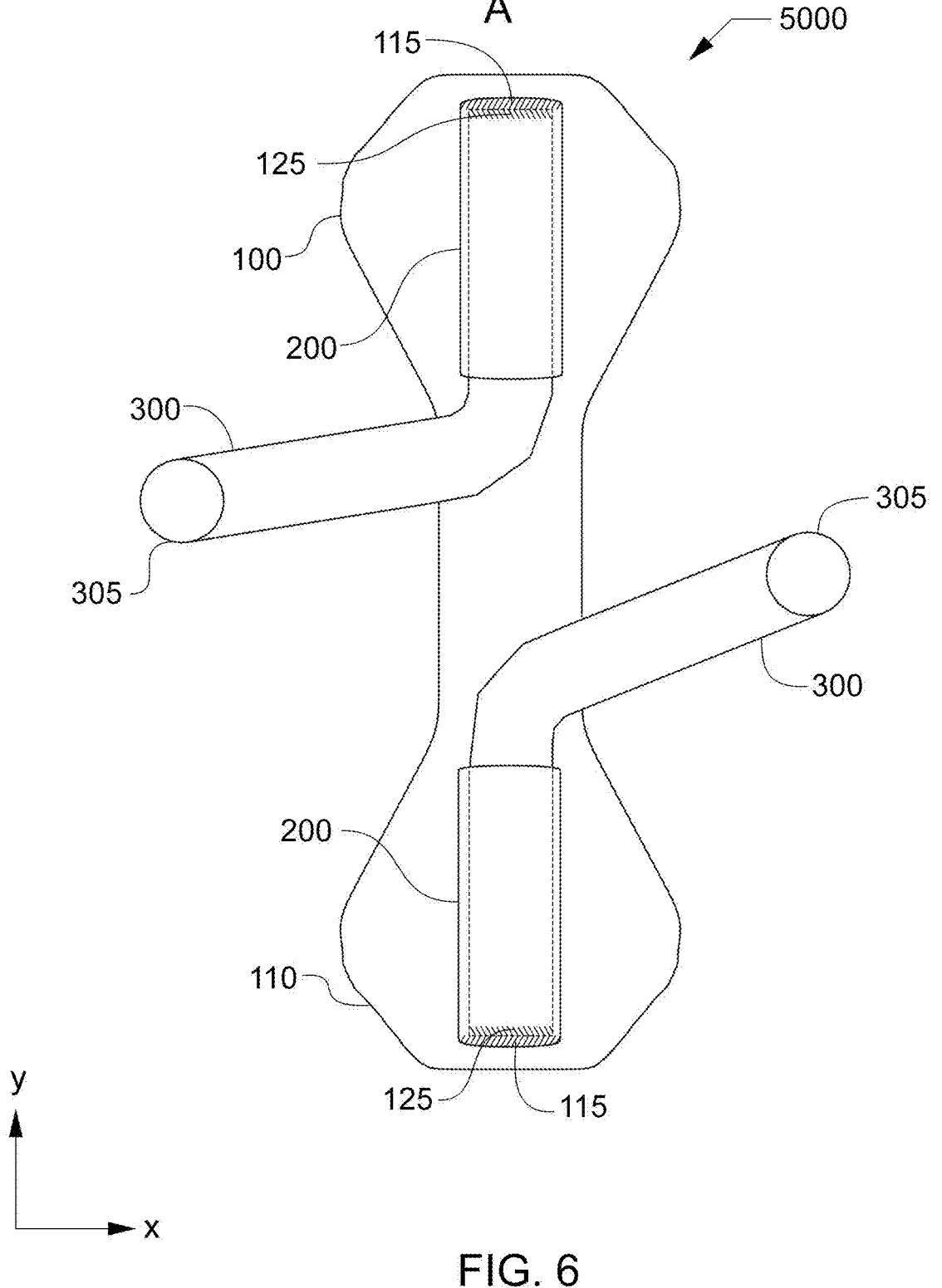
FIG. 6 shows a top view of a communicable information three-dimensional multilayer flexile stack in accordance with another exemplary embodiment.

Turning now to FIG. 6 is shown a top view of a communicable information three-dimensional multilayer flexile stack 5000 in accordance with another exemplary embodiment. As shown in FIG. 6, the three-dimensional multilayer flexile stack 5000 includes a second intermediate layer set 200 wherein the second intermediate layer set 200 also includes a set of one or more layers that are elongated along said first dimension, such as for example, a Y axis dimension. As depicted in this embodiment, the second intermediate layer set 200 including a set of one or more layers may be arranged along both the first base layer set 100 and also along the first base layer set 110. Moreover, the third slidable layer set 300 includes a set of one or more layers that have a plurality of faces. Each third slidable layer set 300 is moveably embedded within a respective second intermediate layer set 200 and is further securely affixed to the second intermediate layer set 200 in the same manner described above with respect to other embodiments. The three-dimensional multilayer flexile stack 5000 includes elements and features that are similar to the three-dimensional multilayer flexile stacks 1000, 2000, 3000, and 4000, where like element numbers and descriptions correspond to three-dimensional multilayer flexile stacks 1000, 2000, 3000, and 4000. As will be readily understood by those of ordinary skill in the art, the exemplary motions, flexions, and cooperative displacements as were previously described in relation to other embodiments, including the three-dimensional net displacement vector $\overline{U}_{xyz}$, the rotational displacement matrix R($\theta$. $\theta$, $\psi$), and components thereof accordingly correspond to the torsional forces and three-dimensional net displacement vectors of the three-dimensional multilayer flexile stack 5000, and thus will not be further described.

For clarity of explanation, the above description has focused on a representative sample of all possible embodiments, a sample that teaches the principles of the invention and conveys the best mode contemplated for carrying it out. The invention is not limited to the described embodiments. Well known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus, methods, or systems described. Many of those undescribed alternatives, variations, modifications, and equivalents are within the literal scope of the following claims, and others are equivalent. The claims may be practiced without some or all of the specific details described in the specification.

Therefore, while the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

COPYRIGHT

The invention claimed is:

1. A communicable information apparatus for at least one user comprising:

a three-dimensional multilayer flexile stack including, a first base layer set elongated along a first dimension, said first base layer set having a plurality of opposing lobes of arcuate contours; and a second intermediate layer set elongated along said first dimension, said second intermediate layer set arranged in a stacked relation with respect to said first base layer set, said stacked relation is along a second dimension orthogonal to said first dimension, said second intermediate layer set securely affixed to said first base layer set at least along a distal terminus of said second intermediate layer set such that said first base layer set along with said second intermediate layer set are cooperatively displaceable, at least in part; and a third slidable layer set including a plurality of faces and moveably embedded within said second intermediate layer set, said third slidable layer set securely affixed to said second intermediate layer set only along a distal terminus of said second intermediate layer set, said third slidable layer set further including a manipulable handle along a proximal terminus, said third slidable layer set reversibly extensible along said first dimension between a third slidable layer set maximally extended position and a third slidable layer set maximally reverse extended position; and said third slidable layer set containing communicable information upon at least one face of at least one layer within said third slidable layer set, such that information contained on said at least one face of said at least one layer within said third slidable layer set is revealed for communication with at least one user by extending said manipulable handle along said first dimension; and information contained on at least one face of at least one layer within said third slidable layer set is concealed from communication with at least one user by reversibly extending said manipulable handle along said first dimension; and a three-dimensional net displacement vector of at least one lobe of said first base layer set within the three-dimensional multilayer flexile stack is $\overline{U}_{xyz}$, wherein as the manipulable handle of the third slidable layer set extends, the variation in the value of $\overline{U}_{xyz}$ is proportionate.

2. The communicable information apparatus for at least one user of claim 1, wherein said three-dimensional multilayer flexile stack has at least three degrees of translational and rotational freedom during flexure, and a rotational displacement matrix $R(\phi, \theta, \psi)$ is defined for at least one lobe of said first base layer set within the three-dimensional multilayer flexile stack, wherein as the manipulable handle of the third slidable layer set extends, the respective values of $\overline{U}_{xyz}$ and $R(\phi, \theta, \psi)$ each vary.

3. The communicable information apparatus for at least one user of claim 1, wherein said first base layer set comprises indicia on one or more faces of opposing lobes of arcuate contours.

4. The communicable information apparatus for at least one user of claim 1, wherein said three-dimensional multilayer flexile stack comprises at least one textile layer.

5. The communicable information apparatus for at least one user of claim 1, wherein said communicable information comprises at least one sequence of alphabetic, numeric, or alphanumeric indicia.

6. The communicable information apparatus for at least one user of claim 1, wherein said communicable information comprises at least one sequence of pictographic indicia.

7. The communicable information apparatus for at least one user of claim 1, wherein said communicable information comprises at least one sequence of a sacred book chapter and verse reference indicia.

8. The communicable information apparatus for at least one user of claim 1, wherein said communicable information comprises at least one color sequence indicia within the visible light spectrum.

9. The communicable information apparatus for at least one user of claim 1, wherein said communicable information comprises at least one sequence of geometric shape indicia.

10. The communicable information apparatus for at least one user of claim 1, wherein said communicable information comprises at least one sequence of fictional or non-fictional character representations indicia.

11. The communicable information apparatus for at least one user of claim 1, wherein said communicable information comprises at least one sequence of non-English language alphabetic indicia.

12. The communicable information apparatus for at least one user of claim 1, wherein said communicable information comprises at least one sequence of American sign language or an international sign language indicia.

13. The communicable information apparatus for at least one user of claim 1, wherein said communicable information comprises at least one sequence of a musical scale indicia.

14. The communicable information apparatus for at least one user of claim 1, wherein said third slidable layer set contains communicable information upon at least two faces of at least one layer within said third slidable layer set.

15. The communicable information apparatus for at least one user of claim 14, wherein said third slidable layer set contains communicable information upon at least two obverse faces of at least one layer within said third slidable layer set, wherein upon extending said manipulable handle along said first dimension, a first face of at least one layer within said third slidable layer set is revealed for communication with a first user and a second face of said at least one layer within said third slidable layer set is simultaneously revealed for communication with a second user.

16. The communicable information apparatus for at least one user of claim 1, wherein said third slidable layer set securely affixed to said second intermediate layer set only along a distal terminus is further removably secured via a fastener, wherein said third slidable layer set is removably attached for replacement of said third slidable layer set.

17. A communicable information apparatus for at least one user comprising:

a three-dimensional multilayer flexile stack including, a first base layer set elongated along a first dimension, said first base layer set having a plurality of opposing lobes of arcuate contours; and a second intermediate layer set elongated along said first dimension, said second intermediate layer set arranged in a stacked relation with respect to said first base layer set, said stacked relation is along a second dimension orthogonal to said first dimension, said second intermediate layer set securely affixed to said first base layer set at least along a distal terminus of said second intermediate layer set such that said first base layer set along with said second intermediate layer set are cooperatively displaceable, at least in part; and a third slidable layer set including a plurality of faces and moveably embedded within said second intermediate layer set, said third slidable layer set securely affixed to said second intermediate layer set only along a distal terminus of said second intermediate layer set, said third slidable layer set further including a manipulable handle along a proximal terminus, said third slidable layer set reversibly extensible along said first dimension between a third slidable layer set maximally extended position and a third slidable layer set maximally reverse extended position; and said third slidable layer set containing communicable information upon at least one face of at least one layer within said third slidable layer set, such that information contained on said at least one face of said at least one layer within said third slidable layer set is revealed for communication with at least one user by extending said manipulable handle along said first dimension; and information contained on at least one face of at least one layer within said third slidable layer set is concealed from communication with at least one user by reversibly extending said manipulable handle along said first dimension; and a three-dimensional net displacement vector of at least one lobe of said first base layer set within the three-dimensional multilayer flexile stack is $U_{xyz}$, wherein as the manipulable handle of the third slidable layer set extends, the variation in the value of $U_{xyz}$ is proportionate; and wherein said communicable information comprises at least one sequence of indicia which is alphabetic, numeric, alphanumeric, pictographic, a sacred book chapter and verse reference, a color sequence, a geometric shape, a fictional or non-fictional character representation, a non-English language alphabet, an American sign language, an international sign language, or a musical scale.

18. A communicable information method for at least one user comprising:

forming a three-dimensional multilayer flexile stack including, a step of adding a first base layer set elongated along a first dimension, said first base layer set having a plurality of opposing lobes of arcuate contours; and a step of adding a second intermediate layer set elongated along said first dimension, said second intermediate layer set arranged in a stacked relation with respect to said first base layer set, said stacked relation is along a second dimension orthogonal to said first dimension, said second intermediate layer set securely affixed to said first base layer set at least along a distal terminus of said second intermediate layer set such that said first base layer set along with said second intermediate layer set are cooperatively displaceable, at least in part; and a step of adding a third slidable layer set including a plurality of faces and moveably embedded within said second intermediate layer set, said third slidable layer set securely affixed to said second intermediate layer set only along a distal terminus of said second intermediate layer set, said third slidable layer set further including a manipulable handle along a proximal terminus, said third slidable layer set reversibly extensible along said first dimension between a third slidable layer set extended position and a third slidable layer set reverse extended position; and adding communicable information upon at least one face of at least one layer within said third slidable layer set, such that information contained on said at least one face of said at least one layer within said third slidable layer set is revealed for communication with at least one user by extending said manipulable handle along said first dimension; and said information contained on at least one face of at least one layer within said third slidable layer set is concealed from communication with at least one user by reversibly extending said manipulable handle along said first dimension; and a three-dimensional net displacement vector of at least one lobe of said first base layer set within the three-dimensional multilayer flexile stack is $U_{xyz}$, wherein the step of extending the manipulable handle of the third slidable layer set, varies the value of $U_{xyz}$ proportionately.

19. The communicable information method for at least one user of claim 18, wherein said communicable information comprises at least one sequence of indicia which is alphabetic, numeric, alphanumeric, pictographic, a sacred book chapter and verse reference, a color sequence, a geometric shape, a fictional or non-fictional character representation, a non-English language alphabet, an American sign language, an international sign language, or a musical scale.

20. The communicable information method for at least one user of claim 18, wherein said communicable information method is a teaching method, a learning method, a therapy method, a disciplinary method, an amusement method, a gaming method, a play method, or an entertainment method.

* * * * *